US006932435B2

(12) United States Patent
Cutcher et al.

(10) Patent No.: US 6,932,435 B2
(45) Date of Patent: Aug. 23, 2005

(54) ADHESIVE PATTERNS FOR VEHICLE WHEEL ASSEMBLIES

(75) Inventors: Douglas J. Cutcher, Troy, MI (US); Scott A. Hogan, Sylvan Lake, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 10/704,462

(22) Filed: Nov. 7, 2003

(65) Prior Publication Data

US 2005/0099057 A1 May 12, 2005

(51) Int. Cl.[7] ................................................. B60B 7/06
(52) U.S. Cl. ................................. 301/37.11; 301/37.43
(58) Field of Search ............................ 301/37.11, 37.43, 301/37.101, 37.102

(56) References Cited

U.S. PATENT DOCUMENTS

| | | | |
|---|---|---|---|
| 3,669,501 A | | 6/1972 | Derleth |
| 4,344,654 A | | 8/1982 | Apezynski |
| 5,368,370 A | | 11/1994 | Beam |
| 5,435,631 A | | 7/1995 | Maloney et al. |
| 5,458,401 A | | 10/1995 | Baccman |
| 5,461,779 A | | 10/1995 | Beam |
| 5,590,935 A | | 1/1997 | McAllister |
| 5,595,423 A | | 1/1997 | Heck et al. |
| 5,597,213 A | | 1/1997 | Chase |
| 5,630,654 A | | 5/1997 | Chase |
| 5,664,845 A | | 9/1997 | Maloney et al. |
| 5,829,843 A | * | 11/1998 | Eikhoff ..................... 301/37.43 |
| 5,845,973 A | | 12/1998 | Chase |
| 5,921,634 A | | 7/1999 | Eikhoff |
| 5,931,543 A | | 8/1999 | Smith |
| 6,007,158 A | | 12/1999 | Maloney et al. |
| 6,068,350 A | | 5/2000 | Baumgarten et al. |
| 6,070,947 A | | 6/2000 | Hoyle, Jr. |
| 6,106,075 A | | 8/2000 | Suenaga |
| 6,200,411 B1 | | 3/2001 | Eikhoff et al. |
| 6,209,204 B1 | | 4/2001 | Eikhoff |
| 6,270,167 B1 | | 8/2001 | Kemmerer et al. |
| 6,286,908 B1 | | 9/2001 | Maloney et al. |
| 6,346,159 B1 | | 2/2002 | Chase et al. |
| 6,386,642 B2 | | 5/2002 | Maloney et al. |
| 6,547,341 B1 | | 4/2003 | Griffin |
| 6,554,371 B2 | | 4/2003 | Maloney et al. |
| 6,598,942 B1 | | 7/2003 | Williams |
| 6,609,763 B1 | | 8/2003 | Kinstler et al. |
| 2001/0045769 A1 | | 11/2001 | Maloney et al. |
| 2002/0050736 A1 | | 5/2002 | Maloney et al. |
| 2002/0093242 A1 | * | 7/2002 | Chase et al. .............. 301/37.43 |
| 2002/0153763 A1 | | 10/2002 | Van Houten et al. |
| 2002/0185908 A1 | | 12/2002 | Woelfel |
| 2003/0015912 A1 | | 1/2003 | Chase |
| 2003/0067212 A1 | | 4/2003 | Wrase et al. |
| 2003/0193236 A1 | | 10/2003 | Maloney et al. |

FOREIGN PATENT DOCUMENTS

| | | |
|---|---|---|
| CH | 658 224 | 10/1986 |
| DE | 2 061 702 | 6/1971 |
| DE | 41 32 330 | 5/1992 |
| DE | 43 21 057 | 1/1994 |
| WO | WO 03/013124 | 4/2003 |

* cited by examiner

*Primary Examiner*—Russell D. Stormer
(74) *Attorney, Agent, or Firm*—Butzel Long

(57) ABSTRACT

Adhesive patterns are applied to one of an outboard side of a wheel and an inner surface of a decorative wheel cover and used to bond the decorative wheel cover to the wheel with a spaced therebetween that is partially filled with the cured adhesive. The decorative wheel cover and wheel each include aligned lug nut apertures and aligned decorative openings. The adhesive patterns are configured to allow ambient fluids to enter throughout the space between the decorative wheel cover and the wheel (and leave) which is not filled with the cured adhesive to prevent corrosion from occurring between the decorative wheel cover and wheel.

23 Claims, 3 Drawing Sheets

ADHESIVE PATTERNS FOR VEHICLE WHEEL ASSEMBLIES

TECHNICAL FIELD

The present invention relates to vehicle wheels that have decorative wheel covers secured over the wheels for aesthetic purposes. More specifically, the present invention relates to methods for adhesively securing decorative wheel covers to wheels which methods involve the use of functional adhesive patterns.

BACKGROUND ART

Wheel assemblies that utilize wheel appliques to decorate the external or outboard surfaces of plain steel wheels are well known and are far less expensive to produce than decorative wheels that have to be formed and finished.

Wheel appliques can be secured to wheels by various mechanical engaging structures and/or by adhesives. U.S. Pat. No. 5,664,845 to Maloney et al. discloses a vehicle wheel cover retention system in which the annular lip of the wheel cover is configured to spring outwardly into a groove provided in the inner surface of the wheel. U.S. Pat. No. 5,595,423 to Heck et al. discloses a vehicle wheel cover retention system in which the outer end of the wheel cover is deformed to cover the outer peripheral end of the outboard bead seat retaining flange of the wheel. Both U.S. Pat. No. 5,664,845 to Maloney et al. and U.S. Pat. No. 5,595,423 to Heck et al. utilize an adhesive in cooperation with their respective mechanical engaging structures.

Many wheel assemblies include decorative wheel covers that are adhesively attached to underlying wheels. U.S. Pat. No. 3,669,501 to Derleth discloses the use of a foamable adhesive that is used to secure a decorative cover to a wheel. The decorative cover in Derleth is configured to have variations in contour in a direction transverse to the axis of the wheel which exceed the variations in the rim and/or disc contour of the wheel, which variations would be extremely difficult and expensive, if not impossible, to stamp or draw in the disc of the wheel. During assembly, a foamable adhesive is coated on the wheel, and the decorative cover is then quickly clamped to the wheel before the adhesive begins to foam. As the adhesive foams, void spaces between the wheel and cover are filled with the foamable adhesive.

Turbine openings which can be decoratively designed are a necessary element in today's wheel systems in providing proper cooling to brake systems. In addition the aesthetics of endless configurations of turbine openings add individuality and style to a vehicle wheels. The inclusion of turbine openings in wheels and wheel covers creates problems with the use of adhesives. In order to use foamable adhesives, it would be necessary to use some additional structure to seal large openings such as turbine openings to prevent the foamable adhesive from escaping through the openings rather than spread evenly or completely between a wheel and wheel cover.

U.S. Pat. Nos. 5,368,370 and 5,461,779 to Beam disclose an ornamental applique formed on a uniform thickness of stainless steel sheet stock that requires attachment to the wheel by the use of a full surface curable adhesive uniformly deposited between the stainless steel cover and a mechanical locking arrangement. The mechanical locking arrangement consists of an undercut in the rim of the wheel into which the cover nests and a hole in the wheel aligned with a hole in the applique wherein a lug stud is permanently attached to create a mechanical lock that, according to Beam's teachings, compresses the full surface uniform layer of curable adhesive to hold the applique in place until the adhesive cures.

Beam's teachings exemplify an early concern that adhesives used to secure wheel covers onto wheel assemblies had to be applied as continuous coatings between the wheel covers and wheels in order to secure the attachment and prevent moisture and dirt from entering any gaps between the wheel covers and wheels and causing corrosion to develop.

There are some restrictions on the types of adhesives that can be used to secure wheel covers to wheels and considerations on how to apply some adhesives. Suitable adhesives have to withstand the high temperatures generated by tires, wheels and breaking systems. In the case of air-cured and moisture-cured adhesives, it has been discovered that the use of continuous coatings of the adhesives between wheel covers and a wheels adversely effects cure time.

U.S. Pat. No. 5,597,213 to Chase exemplifies the use beads of adhesive that are provide in parallel as separated lines of adhesive rather than a continuous layer to create voids so as to reduce the amount of curing time of the adhesive and thereby reduce manufacturing time and costs. In Chase, air between the lines of adhesives is captured between the overlay and the wheel to assist in curing the adhesive. In the case of adhesives that are moisture-cured, Chase proposes introducing high humidity air into the assembly process and the technique of selective application of the adhesive to establish voids between lines of adhesive that serve to entrap moisture laden air further enhancing cure times and reducing overall costs of the manufacturing process.

U.S. Pat. No. 6,007,158 to Maloney et al. teaches a vehicle cover retention system and method for producing the same. Maloney et al. applies an adhesive in a pattern, which when pressed between the wheel cover and wheel can fill less that the entire gap between the wheel cover and wheel, but nevertheless is effective to prevent water, mud and debris from entering into any voids or gaps between the wheel cover and wheel.

Adhesive patterns exemplified in FIG. 6 of Maloney et al. are designed to establish seals that prevent water, mud and debris from entering any voids, gaps or other spaces between the wheel covers and the wheels. The concern remains that if such water, mud and debris enter any voids, gaps or other spaces between the wheel covers and the wheels, it will eventually cause corrosion to occur between the wheel covers and wheel and result in detachment of the wheel cover or at an unsightly appearance.

The present invention provides a method for adhesively securing decorative wheel covers to wheels which methods involve the use of functional adhesive patterns that are not found in the prior art.

DISCLOSURE OF THE INVENTION

According to various features, characteristics and embodiments of the present invention which will become apparent as the description thereof proceeds, the present invention provides a method of securing a wheel cover to a wheel to form a wheel assembly which method involves:

providing a wheel having an outboard surface with a plurality of centrally located lug nut apertures formed in the outboard surface and a plurality of openings formed in the outboard surface and spaced radially outwardly from the lug nut apertures;

providing a wheel cover having an inner surface and a plurality of centrally located lug nut apertures formed in the wheel cover which correspond to the lug nut apertures of the wheel, and a plurality of decorative openings formed in the wheel cover and spaced radially outwardly from the lug nut apertures, which plurality or opening correspond to the plurality of openings form in the wheel cover;

applying an adhesive pattern to at least one of the outboard surface of the wheel or the inner surface of the wheel cover; and assembling the wheel cover to the wheel to cause the adhesive to contact both the outboard surface of the wheel and the inner surface of the wheel cover and thereby enable the adhesive pattern to secure the wheel cover to the wheel and define a space between the wheel cover and wheel which is not filled with adhesive, the adhesive applied pattern including a configuration of beads of adhesive that after contacting both the outboard surface of the wheel and the inner surface of the wheel cover allows ambient fluids to enter throughout the space between the wheel cover and the wheel which is not filled with adhesive and exit the space.

The present invention also provides a wheel assembly which comprises:

a wheel having an outboard surface with a plurality of centrally located lug nut apertures formed in the outboard surface and a plurality of openings formed in the outboard surface and spaced radially outwardly from the lug nut apertures;

a wheel cover having an inner surface and a plurality of centrally located lug nut apertures formed in the wheel cover which are aligned with the lug nut apertures of the wheel, and a plurality of decorative openings formed in the wheel cover and spaced radially outwardly from the lug nut apertures, which plurality or opening are aligned with the plurality of openings form in the wheel cover;

a cured adhesive between the wheel and wheel cover which bonds the wheel and wheel cover together with a space between the wheel and wheel cover which space is partially filled with the cured adhesive, the cured adhesive being provided in a pattern allows ambient fluids to enter throughout the space between the wheel cover and the wheel which is not filled with adhesive and exit the space.

BRIEF DESCRIPTION OF DRAWINGS

The present invention will be described with reference to the attached drawings which are given as non-limiting examples only, in which.

BEST MODE FOR CARRYING OUT THE INVENTION

Figures 1, 2:
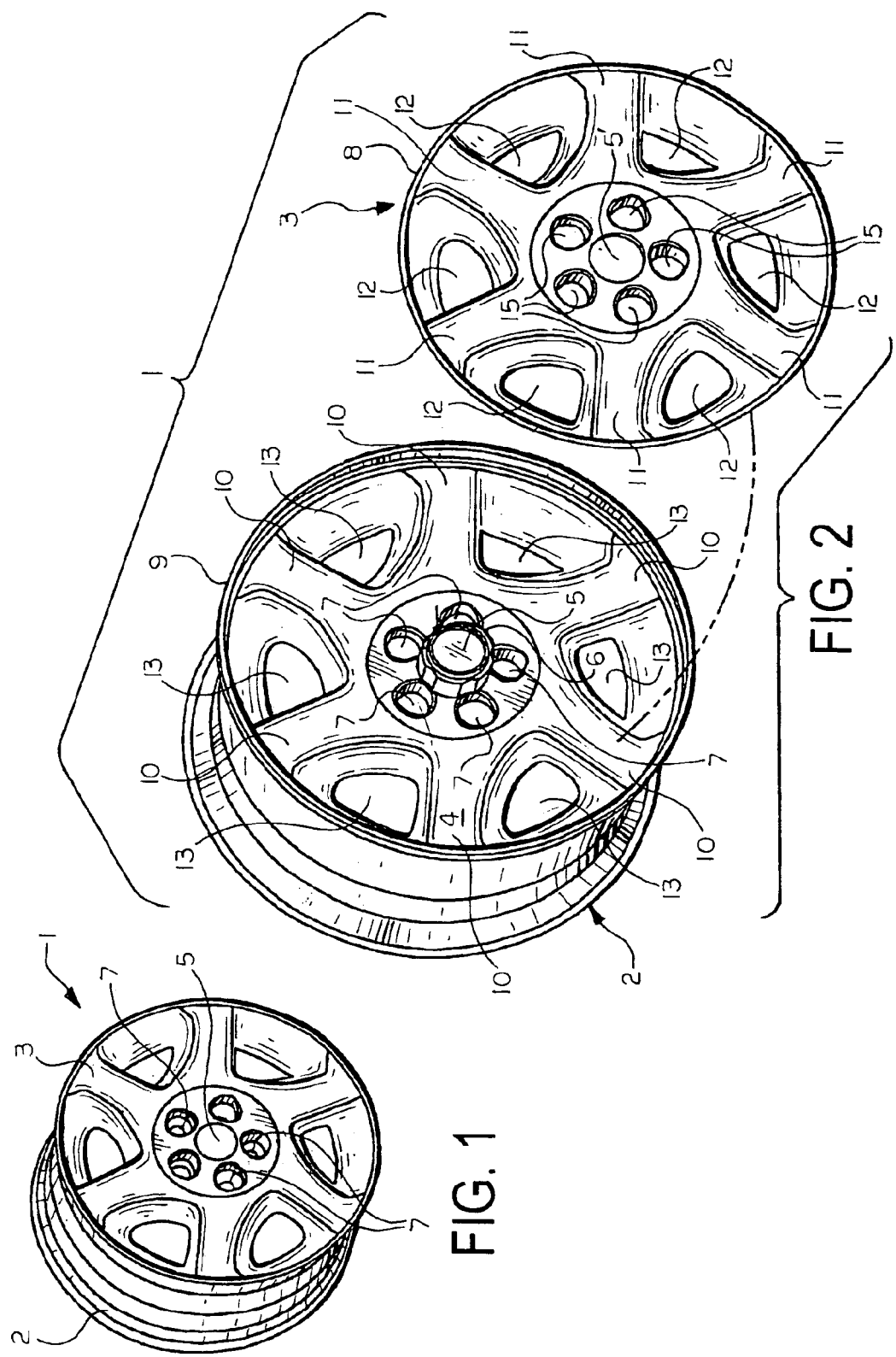
FIG. 1 is a perspective view of a wheel assembly according to one embodiment of the present invention.
FIG. 2 is an exploded perspective view of the wheel assembly of FIG. 1.

FIG. 1 is a perspective view of a wheel assembly according to one embodiment of the present invention. The wheel assembly which is generally identified by reference numeral 1 includes a wheel 2 that can be made of aluminum, magnesium, steel, or other material conventionally used for manufacturing vehicle wheels. A decorative wheel cover 3 is bonded to the otherwise outer exposed surface 4 (See FIG. 2) of wheel 2. The wheel cover 3 is a solid panel of a high-impact plastic that has a high temperature resistance or can be a thin metallic panel such as stainless steel that, in either case has a finished outer surface that can be painted, textured or plated, e.g. chrome plated as desired. An advantage of using a high-impact plastic material such as a combination of polycarbonate and ABS having is that wheel covers 3 made from such materials can be injection molded.

Wheel 2 is of the type which includes a small central opening 5 in the wheel hub 6 and a plurality of exposed lug nut apertures 7 arranged in a circular pattern and spaced for the particular vehicle on which wheel assembly 1 is to be employed. Opening 5 will typically be enclosed by a relatively small cap while the lug nuts themselves (not shown) are exposed once the wheel assembly 1 is mounted to a vehicle.

Wheel cover 3 has a geometry and contour which substantially conform to that of wheel 2, namely, an outer peripheral edge 8 which matingly fits within rim 9 of wheel 2. Spokes 11 extend radially outwardly from the center hub opening 5 which correspond in size, shape and location to the spokes 10 on wheel 2. Between the spokes 11 of wheel cover 3 are decorative openings or windows 12 that are shaped to conform to corresponding decorative openings or windows 13 in wheel 2. The central hub area surrounding central opening 14 of wheel cover 3 also includes a plurality of lug nut receiving openings 15 which align with and are received within openings 7 in wheel 2 when the wheel cover 3 is position on the wheel 2. The central opening 14 of the wheel cover 3 is aligned with opening 5 in wheel hub 6, as best seen in FIG. 1. When the wheel cover 3 is bonded to wheel 2, the wheel cover 3 appears as an integral outer surface of the wheel 1, as depicted in FIG. 1.

The wheel cover 3 is bonded to wheel 2 by beads or lines of a suitable bonding adhesive which are arranged in patterns that provide a unique function to the present invention. The adhesive patterns, which can vary from one to another, are each similar in that they are configured to avoid allowing the adhesive to form a continuous adhesive layer between the wheel cover 3 and the wheel 2. In addition, the adhesive patterns are each configured to avoid establishing the type of seals that are conventionally provided to prevent water, mud and debris from entering any voids, gaps or other spaces between the wheel covers and the wheels. Thus, the adhesive patterns of the present invention are a departure from conventional adhesive patterns that are configured to establish seals that prevent water, mud and debris from entering any voids, gaps or other spaces between the wheel covers and the wheels. Whereas such prior art adhesive patterns address concerns that if such water, mud and debris enter any voids, gaps or other spaces between the wheel covers and the wheels, it will eventually cause corrosion to occur between the wheel covers and wheel and result in detachment of the wheel cover or at an unsightly appearance, the present inventors have discovered that such prior art adhesive patterns often fail and expedite the deterioration of wheel assemblies.

Figure 3:
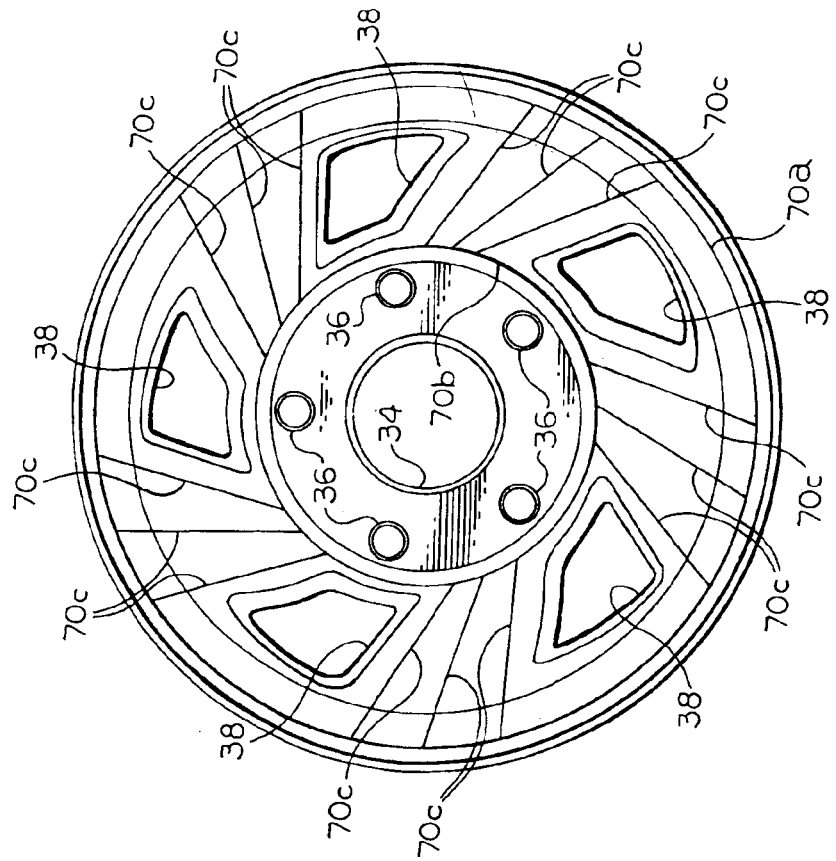
FIG. 3 is an example of a prior art adhesive pattern used in wheel assemblies.

FIG. 3 is an example of a prior art adhesive pattern used in wheel assemblies. The adhesive pattern depicted in FIG. 3 can be found in U.S. Pat. No. 6,286,908 to Maloney et al. which teaches that this adhesive pattern is effective to provide a seal and prevent water, mud and other debris from entering between the cover and the outboard facing surface of the disc (wheel).

The adhesive pattern in FIG. 3 includes and inner circle of adhesive 70B, and outer circle of adhesive 70A, and a number of radial lines of adhesive 70C. The inner circle of adhesive 70B seals off a central hub opening 34 and lug nut apertures 36. The inner circle of adhesive 70B, outer circle of adhesive 70A, and radial lines of adhesive 70C effectively seal off the decorative openings or windows 38. When the wheel cover is pressed onto the wheel, the adhesive is configured to spread between the wheel cover and wheel.

However, the present inventors have discovered that when adhesive patterns are used which seal off areas such as any of the areas bounded on all sides by inner circle of adhesive 70B, outer circle of adhesive 70A, two of radial lines of adhesive 70C in FIG. 3, air trapped within the area becomes compressed when the wheel cover and wheel are pressed together and breaches a portion of one of the beads or lines of adhesive. As a result, the goal of providing a seal and preventing water, mud and other debris from entering between the cover and the outboard facing surface of the wheel is not met, but rather spoiled. Such a problem is common in wheel assemblies that use adhesive patterns that provide beads or lines of adhesive around the outer peripheral edge of the wheel cover and around each opening, including vent/decorative openings, lug nut apertures (separately or collectively) and wheel hub openings. Such adhesive patterns which are intentionally designed to seal off the gap between the wheel covers and wheel around the outer peripheral edge and openings ironically create pockets of air that becomes pressurized upon assembly and defeat the goal of providing a seal.

The present inventors have further concluded that the breached areas of the adhesive beads or lines are typically sufficiently small so that water, mud and other debris that passes through the breached areas becomes effectively trapped within pockets that, except for the breached areas, are otherwise sealed. For example, water that enters the pockets through the breached areas can only pass out of the pockets if the water "finds" the breached areas again. This may be difficult when the wheel assembly rotates and the orientation of the pockets and breached areas keep changing.

Figure 4:
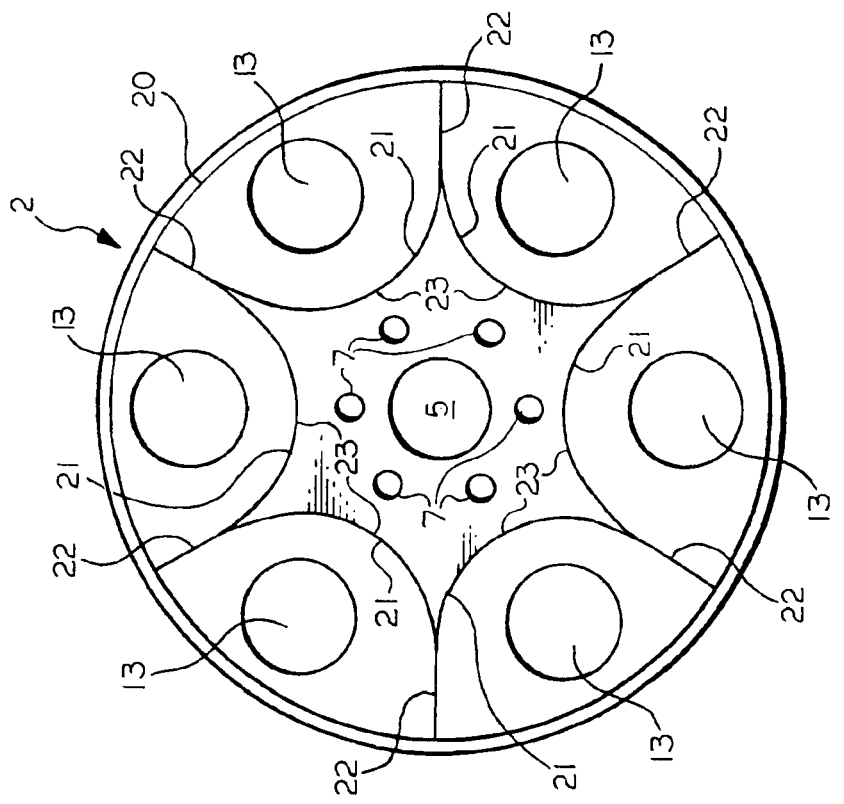
FIG. 4 is an exemplary adhesive pattern according to one embodiment of the present invention.

FIG. 4 is an exemplary adhesive pattern according to one embodiment of the present invention. FIG. 4 illustrates an adhesive pattern that can be provided on either the outboard surface of a wheel or in inner surface of a wheel cover. For purposes of describing the present invention, it will be assumed that FIG. 4 illustrates the an adhesive pattern that is provided on the outboard surface of a wheel and that the corresponding wheel cover includes decorative openings or windows, lug nut apertures and a central hub opening that are sized, shaped and positioned complementarily to the decorative openings or windows 13, lug nut apertures 7 and central hub opening 5 of the wheel 2 in FIG. 4 (and FIG. 5).

The adhesive patterns of the present invention are defined by beads or lines of an adhesive material that can be continuous or discontinuous. Generally, applying continuous beads or lines of adhesive are more efficient using automated equipment. According to the resent invention the beads or lines of adhesive are not required to spread more than a marginal amount necessary to secure the wheel cover to the wheel. That is, it is not necessary according to the present invention to configure the beads or lines of adhesive so that when the wheel cover and wheel are pressed together the adhesive spreads to fill most of the gap or even a major portion of the gap between the wheel cover and the wheel as in the case of U.S. Patent Publication No. 2002/0185908 to Woelfel that uses a foamed-in-place adhesive. For purposes of the present invention, the adhesive beads or lines do not have to spread to cover more than a marginal amount necessary to secure the wheel cover to the wheel and can spread to fill up to 60% or more of the gap between the wheel covers and wheels.

In FIG. 4 there is a circular bead or line of adhesive 20 that extends along the outer peripheral edge of the wheel 2 and a series of adhesive beads or lines 21 that loop inward from the circular bead or line of adhesive 20. The loop beads or lines of adhesive 21 are shown as having common or overlapping leg portions 22 and apexes 23 that are positioned between the decorative openings or windows 13 and the lug nut apertures 7.

It is noted that in FIG. 4 there are no areas surrounded by adhesive beads or lines that are completely sealed, i.e., that do not contain either a decorative opening or window 13 or the lug nut and central hub openings 7 and 15. Accordingly, when the adhesive pattern shown in FIG. 4 is provided between a wheel cover and a wheel and the two are pressed toward one another, there are no sealed pockets defined by the adhesive pattern in which air can become entrapped and compressed. The adhesive pattern depicted in FIG. 4 allows all the air between the wheel cover and wheel to escape through either the decorative openings or windows 13, the lug nut apertures 7 and/or the central hub opening 5.

Figure 5:
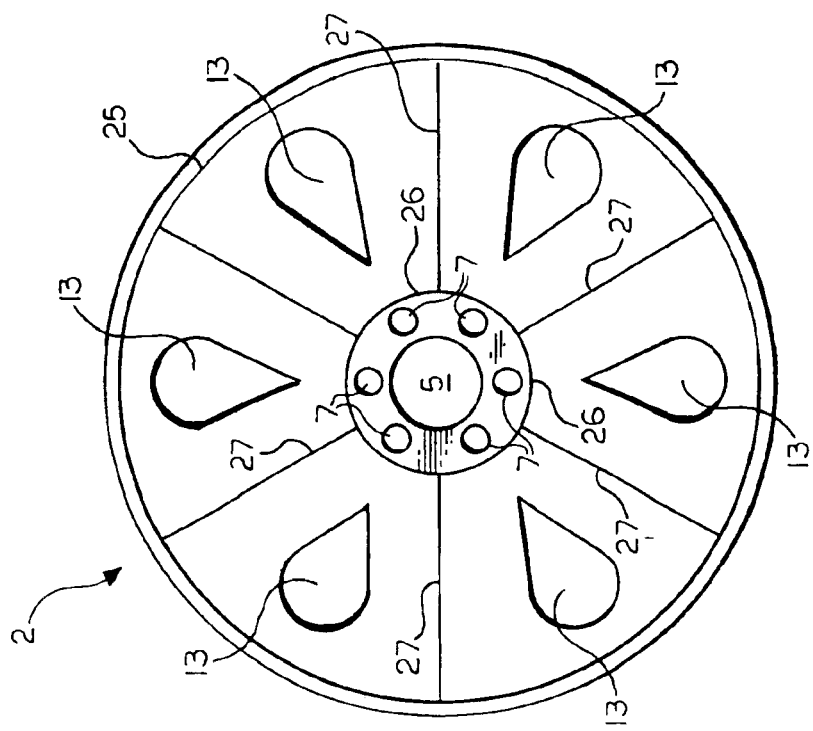
FIG. 5 is another exemplary adhesive pattern according to one embodiment of the present invention.

FIG. 5 is another exemplary adhesive pattern according to one embodiment of the present invention. FIG. 5 illustrates an adhesive pattern that can be provided on either the outboard surface of a wheel or in inner surface of a wheel cover. For purposes of describing the present invention, it will be assumed that FIG. 5 illustrates an adhesive pattern that is provided on the outboard surface of a wheel and that the corresponding wheel cover includes decorative openings or windows, lug nut apertures and a central hub opening that are sized, shaped and positioned complementarily to the decorative openings or windows 13, lug nut apertures 7 and central hub opening 5 of the wheel 2 in FIG. 5.

In FIG. 5 there is an outer circular bead or line of adhesive 25 that extends along the outer peripheral edge of the wheel 2 and an inner circular bead or line of adhesive 26 that surrounds the lug nut apertures 7. In addition, the adhesive pattern depicted in FIG. 5 includes a single bead or line of adhesive 27 that extends radially between each adjacent pair or the decorative openings of windows 13.

It is noted that in FIG. 5 there are no areas surrounded by adhesive beads or lines that are completely sealed, i.e., that do not contain either a decorative opening or window 13 or the lug nut and central hub openings 5 and 7. Accordingly, when the adhesive pattern shown in FIG. 5 is provided between a wheel cover and a wheel and the two are pressed toward one another, there are no sealed pockets defined by the adhesive pattern in which air can become entrapped and compressed. The adhesive pattern depicted in FIG. 5 allows all the air between the wheel cover and wheel to escape through either the decorative openings or windows 13, the lug nut apertures 7 and/or the central hub opening 5.

It is to be understood that the adhesive patterns depicted in FIGS. 4 and 5 are non-limiting examples of adhesive patterns that are useful for purpose of the present invention. Any adhesive pattern which does not define sealed pockets in which air can be trapped when the wheel covers and wheels are pressed together are useful for purpose of the present invention. The exact shape of the loop beads or lines of adhesive 21 in FIG. 4 and the radial beads or lines of adhesive 27 in FIG. 5 can vary from the patterns as shown. For example, triangular or trapezoidal beads or lines of adhesive could be used in place of the loop beads or lines of adhesive 21 in FIG. 4. Moreover the triangular or trapezoidal or loop beads or lines of adhesive could have separate spaced apart legs rather than common legs. As a further example, the radial beads or lines of adhesive 27 in FIG. 5 can be curved, zigzagged, angled or positioned other than centrally between the decorative openings or windows 13 as shown.

Figure 6:
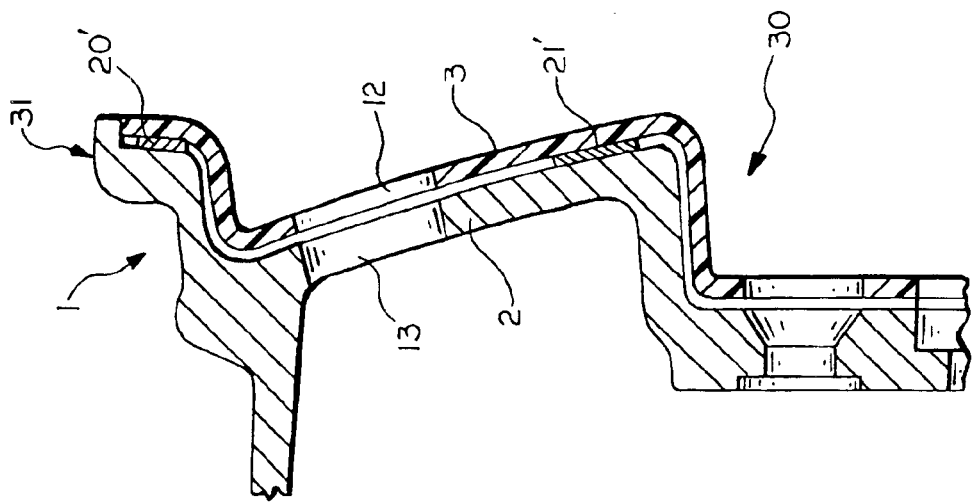
FIG. 6 is a cross-sectional view of a wheel assembly according to the present invention taken through one of the decorative openings or windows of a wheel assembly that include the adhesive pattern shown in FIG. 4.

FIG. 6 is a cross-sectional view of a wheel assembly according to the present invention taken through one of the decorative openings or windows of a wheel assembly that include the adhesive pattern shown in FIG. 4. In FIG. 6 the wheel has a recessed central portion 30 which is not shown in FIG. 4. The wheel cover 3 is shown as being secured to wheel 2 by adhesive areas 20' and 21' which correspond to the circular bead or line of adhesive 20 that extends along the outer peripheral edge of the wheel 2 and the loop beads or lines of adhesive 21 respectively. The decorative openings or windows 13 and lug nut apertures 15 in the wheel cover 3 are positioned over the decorative openings or windows 13 and lug nut apertures 7 in the wheel 2. The adhesive area 20' is near the outboard bead seat retaining flange 31 of the wheel 2.

It is to be understood that the adhesive patterns of the present invention can be used in conjunction with wheel assemblies that use full or partial wheel covers, including wheel covers that extend over and cover the outboard bead seat retaining flange of wheels. In addition, although not shown, the adhesive patterns of the present invention can be used in conjunction with various known mechanical engaging structures.

The present invention can use any conventional adhesive material. However, foamable adhesives should generally be avoided, particularly when the outboard surface of the wheel and the wheel cover have similar contoured shapes. The adhesive patterns of the present invention will be particularly suitable for use in conjunction with air and/or moisture cured adhesives since the adhesive patterns allow air and moisture to reach the adhesive throughout the adhesive patterns.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of securing a wheel cover to a wheel to form a wheel assembly which method comprises:
providing a wheel having an outboard surface with a plurality of centrally located lug nut apertures formed in the outboard surface and a plurality of openings formed in the outboard surface and spaced radially outwardly from the lug nut apertures;
providing a wheel cover having an inner surface and a plurality of centrally located lug nut apertures formed in the wheel cover which correspond to the lug nut apertures of the wheel, and a plurality of decorative openings formed in the wheel cover and spaced radially outwardly from the lug nut apertures, which plurality of openings correspond to the plurality of openings formed in the wheel cover;
applying an adhesive pattern to at least one of the outboard of the wheel or the inner surface of the wheel cover, said adhesive pattern including at least one continuous, substantially circular portion which is concentric with at least one of the wheel or wheel cover; and
assembling the wheel cover to the wheel to cause the adhesive to contact both the outboard surface of the wheel and the inner surface of the wheel cover and thereby enable the adhesive pattern to secure the wheel cover to the wheel and define a space between the wheel cover and wheel which is not filled with adhesive,
said adhesive applied pattern including a configuration of beads of adhesive that after contacting both the outboard surface of the wheel and the inner surface of the wheel cover allows ambient fluids to enter throughout the space between the wheel cover and the wheel which is not filled with adhesive and exit the space.

2. A method of securing a wheel cover to a wheel according to claim 1, wherein the adhesive pattern comprises a non-foaming adhesive.

3. A method of securing a wheel cover to a wheel according to claim 1, wherein the beads of adhesive are configured to spread to fill less than 60% space between the wheel cover and the wheel.

4. A method of securing a wheel cover to a wheel according to claim 1, wherein the at least one continuous, substantially circular portion of the applied adhesive pattern comprises a bead of adhesive that extends along an outer peripheral edge of the at least one of the outboard surface of the wheel or the inner surface of the wheel cover to which the adhesive pattern is applied.

5. A method of securing a wheel cover to a wheel according to claim 4, wherein the configuration of beads of adhesive further include individual beads of adhesive that extend in the shape of loops that extend radially inwardly around separate ones of the openings and have legs that contact the circular shaped bead of adhesive.

6. A method of securing a wheel cover to a wheel according to claim 4, wherein the configuration of beads of adhesive further includes a bead of adhesive that extends in a circular shape and is positioned radially between the lug nut apertures and the openings.

7. A method of securing a wheel cover to a wheel according to claim 6, wherein the configuration of beads of adhesive further include individual beads of adhesive that extend between the circular shaped bands of adhesive and are positioned between adjacent ones of the openings.

8. A method of securing a wheel cover to a wheel according to claim 1, wherein the configuration of beads of adhesive comprises continuous beads of adhesive.

9. A method of securing a wheel cover to a wheel according to claim 1, wherein the wheel cover is made from one of metal and a plastic material.

10. A method of securing a wheel cover to a wheel according to claim 1, wherein the openings are circular.

11. A method of securing a wheel cover to a wheel according to claim 1, wherein the openings are non-circular.

12. A method of securing a wheel cover to a wheel according to claim 1, wherein the outboard surface of the wheel and the inner surface of the wheel cover have matching contours.

13. A wheel assembly which comprises:
a wheel having an outboard surface with a plurality of centrally located lug nut apertures formed in the outboard surface and a plurality of openings formed in the outboard surface and spaced radially outwardly from the lug nut apertures;

a wheel cover having an inner surface and a plurality of centrally located lug nut apertures formed in the wheel cover which are aligned with the lug nut apertures of the wheel, and a plurality of decorative openings formed in the wheel cover and spaced radially outwardly from the lug nut apertures, which plurality or opening are aligned with the plurality of openings form in the wheel cover;

a cured adhesive between the wheel and wheel cover which bonds the wheel and wheel cover together with a space between the wheel and wheel cover which space is partially filled with the cured adhesive, the cured adhesive being provided in a pattern which allows ambient fluids to enter throughout the space between the wheel cover and the wheel which is not filled with adhesive and exit the space;

said pattern of cured adhesive including at least one continuous, substantially circular portion which is concentric with at least on of the wheel or wheel cover.

14. A wheel assembly according to claim 13, wherein the cured adhesive comprises a non-foamed adhesive.

15. A wheel assembly according to claim 13, wherein the adhesive fills less than 60% space between the wheel cover and the wheel.

16. A wheel assembly according to claim 13, wherein the at least one continuous, substantially circular portion of said cured adhesive is provided along an outer peripheral edge of the wheel assembly between the wheel cover and the wheel.

17. A wheel assembly according to claim 16, wherein the cured adhesive pattern further includes discrete portions of adhesive that extend in the shape of loops that extend radially inwardly around separate ones of the openings and have legs that contact the circular shaped line of adhesive.

18. A wheel assembly according to claim 16, wherein the cured adhesive pattern further includes a line of adhesive that extends in a circular shape and is positioned radially between the lug nut apertures and the openings.

19. A wheel assembly according to claim 18, wherein the cured adhesive pattern further includes individual lines of adhesive that extend between the circular shaped lines of adhesive and are positioned between adjacent ones of the openings.

20. A wheel assembly according to claim 13, wherein the wheel cover is made from one of a metal and a plastic material.

21. A wheel assembly according to claim 13, wherein the openings are circular.

22. A wheel assembly according to claim 13, wherein the openings are non-circular.

23. A wheel assembly according to claim 13, wherein the outboard surface of the wheel and the inner surface of the wheel cover have matching contours.

* * * * *